April 26, 1966   U. SAFTIEN   3,248,100
SPRING CONSTRUCTION FOR VEHICLES
Filed March 18, 1964
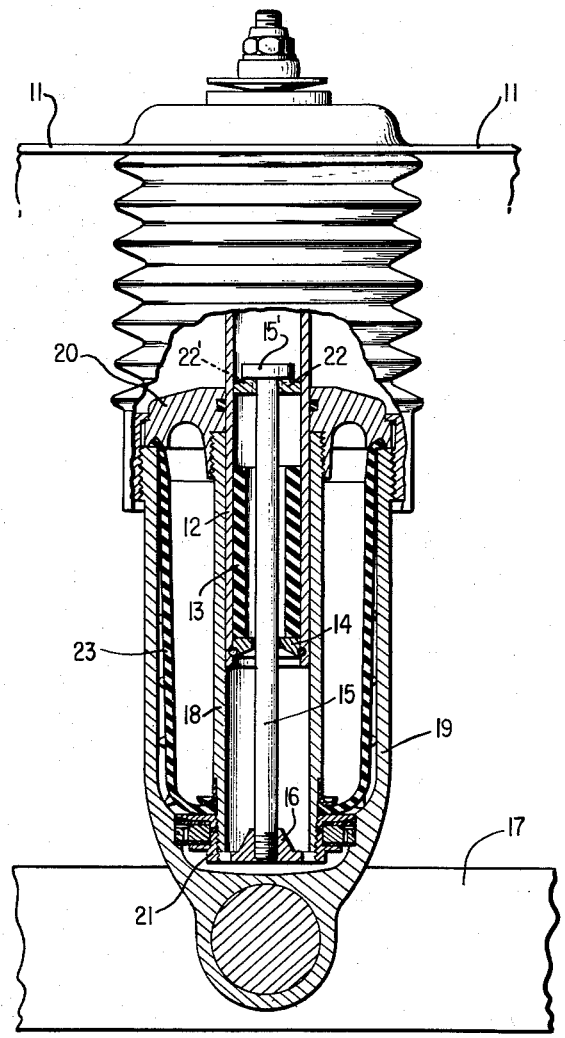
INVENTOR.
UDO SAFTIEN
BY Dieke & Craig
ATTORNEYS.

United States Patent Office 3,248,100
Patented Apr. 26, 1966

3,248,100
SPRING CONSTRUCTION FOR VEHICLES
Udo Saftien, Waiblingen, Germany, assignor to Daimler-Benz Aktiengesellschaft, Stuttgart-Untertürkheim, Germany
Filed Mar. 18, 1964, Ser. No. 352,811
Claims priority, application Germany, Mar. 19, 1963,
D 26,497
13 Claims. (Cl. 267—64)

The present invention relates to an arrangement for limiting the outward spring stroke in hydro-pneumatic vehicle spring systems, and more particularly, in hydro-pneumatic spring systems for motor vehicles having a hydro-pneumatic spring suspension formed by spring legs, each including a guide tube connected rigidly with the vehicle body, which serves for the longitudinally movable support, on the one hand, of the pot or cartridge of the spring leg associated with the wheel suspension and, on the other, of a sliding tube, whereby an elastic abutment is provided at the lower end of the guide tube.

It is known with hydro-pneumatically operating spring legs of motor vehicles to secure outside at the lower end of the guide tube, rigidly connected with the vehicle body, a collar which serves for the support of an elastic ring against which strikes near the end of the outward spring deflection the annular zone of the cover of the spring pot disposed about the guide tube, while a sliding tube securely connected wtih the cover of the spring pot slides along the outside of the aforementioned collar. A relatively large annular space if normally provided in these prior art constructions between the sliding tube and the outer walls of the spring pot which serves for the accommodation of the spring element constituted in such types of construction by the spring medium "air" enclosed within a rubber bellows.

The present invention is concerned with the task to increase the annular space for the accommodation of the air bellows with the same external diameter of the spring pot or to utilize more favorably and efficiently, from a structural point of view, the internal space of the spring leg.

The task and underlying problems are solved in that according to the present invention the elastic abutment for limiting the outward spring stroke is arranged within the guide tube in the lower region thereof and that a rod or similar connecting element extends through this abutment, whereby the upper end of the rod forms or carries a counter-abutment cooperating with the elastic abutment and the lower end thereof is connected with a part of the spring leg coordinated to or operatively associated with the wheel suspension.

The space within the guide tube is thereby utilized advantageously for the accommodation of the mechanism for the limitation of the outward spring stroke by the improvement according to the present invention.

Accordingly, it is an object of the present invention to provide a spring structure, and more particularly a hydro-pneumatic spring structure of the type described above which obviates the shortcomings and inadequacies encountered with the prior art constructions by simple and operationally reliable means.

Another object of the present invention resides in the provision of a spring leg structure of the type described above in which the annular space accommodating therein the pneumatic bellows can be effectively enlarged compared to analogous prior art constructions while maintaining the same external dimensions, thereby assuring a larger volume of spring medium constituted by the air within a spring leg of given external dimensions.

Still another object of the present invention resides in the provision of a spring leg structure for hydro-pneumatic spring systems of motor vehicles in which the space within the guide tube is utilized more advantageously for the accommodation of the means limiting the spring stroke.

A further object of the present invention resides in the provision of a mechanism limiting the outward spring stroke in hwdro-pneumatic spring systems for vehicles which is simple in structure, utilizes relatively few parts, can be easily assembled and disassembled, yet is extremely reliable in operation.

Still another object of the present invention resides in the provision of a spring leg construction for hydro-pneumatic spring systems for motor vehicles in which the inner space of the spring leg can be utilized more favorably for the accommodation of the structural parts thereof.

These and other objects, features, and advantages of the present invention will become more obvious from the following description when taken in connection with the accompanying drawing, which shows, for purposes of illustration only, one embodiment in accordance with the present invention:

Referring now to the drawing which shows in the single figure thereof a cross-sectional view through one embodiment of a hydro-pneumatic spring leg in accordance with the present invention, reference numeral 11 designates therein the vehicle body or frame of the motor vehicle which will be referred to hereinafter by the term "superstructure." An elastic abutment 13 in the form of a hollow cylinder is arranged within the area of the lower end of the guide tube 12 rigidly connected in any suitable manner with the vehicle superstructure 11. The lower end of the abutment 13 rests on a ring 14 which is detachably and removably secured within the guide tube 12 by any conventional means. A rod 15 extends through the elastic abutment 13. The lower end of the rod 15 is threaded into a bottom piece 16. A relatively large annular gap remains between the rod 15 and the inner diameter of the elastic abutment 13 in the non-spring-deflected or relieved condition of the latter in order to create a displacement space for the elastic material of the abutment 13. The structural parts of the spring leg operatively associated with the wheel suspensions 17 of any conventional, known construction essentially consists of a sliding tube 18 and of a spring pot 19 having a cover 20 which are threadably connected with each other as indicated in the drawing. The lower end of the sliding tube 18 is provided with an external thread on which is threadably secured a sleeve 21, the lower end of which projects beyond the lower end of the sliding tube 18. The bottom piece 16, in turn, is threaded into the internal thread of the sleeve 21. A collar 15' is provided at the upper end of the rod 15 which serves for the support of a plate or disc-like member 22 that constitutes the counter-abutment for the elastic abutment 13. The disc-like member 22 is provided with grooves 22' (shown in dash lines) for the passage of the hydraulic working medium. Reference numeral 23 designates the rubber bellows for the accommodation of the spring medium "air."

The disc-like member 22 is preferably made of a synthetic plastic material and the length of the elastic abutment 13 is preferably about ⅓ the length of the guide tube 12. Suitable gaskets and seals are also provided as usual where necessary.

Since the operation of the device in accordance with the present invention, which is otherwise conventional, is believed obvious, a detailed description thereof is dspensed with herein.

While I have shown and described one embodiment in accordance with the present invention, it is understood that the same is not limited thereto but is susceptible of numerous changes and modifications as known to a person skilled in the art; and I, therefore, do not wish to be limited to the details shown and described herein, but intend to cover all such changes and modifications as are encompassed by the scope of the appended claims.

I claim:

1. An arrangement for limiting the outward spring stroke in hydro-pneumatic spring systems, especially in the spring legs of hydro-pneumatic spring systems of motor vehicles having a vehicle superstructure and a wheel suspension, comprising a spring leg assembly having a plurality of parts, some of which are operatively associated with the superstructure and some of which with the wheel suspension, and which include:
   a guide tube means in the form of a single tubular member and constituting a part operatively associated with the superstructure,
   spring-leg pot means forming a part of the hydro-pneumatic spring system and slidable tube means connected with said pot means and constituting parts operatively associated with the wheel suspension,
   said guide tube means serving for the longitudinally movable support of said spring-leg pot means and of said slidable tube means, and said slidable tube means sliding directly on the outside of said guide tube means,
   elastic abutment means arranged directly in said guide tube means near the lower end thereof,
   and connecting means extending through said elastic abutment means and including counter-abutment means at the upper end thereof for cooperation with said elastic abutment means and connected at the lower end thereof with the parts operatively associated with the wheel suspension,
   said elastic abutment means being disposed direcly between said guide tube means and said connecting means.

2. An arrangement for limiting the outward spring stroke in hydro-pneumatic spring systems, especially in the spring legs of hydro-pneumatic spring systems of motor vehicles having a vehicle superstructure and a wheel suspension, comprising a spring leg assembly having a plurality of parts, some of which are operatively associated with the superstructure and some of which with the wheel suspension, and which include:
   a guide tube means in the form of a single tubular member and constituting a part operatively associated with the superstructure,
   spring-leg pot means forming a part of the hydro-pneumatic spring system and slidable tube means connected with said pot means and constituting parts operatively associated with the wheel suspension,
   said guide tube means serving for the longitudinally movable support of said spring-leg pot means and of said slidable tube means,
   elastic abutment means arranged directly within said guide tube means in the lower region thereof,
   and connecting means including a rod extending through said elastic abutment means and including counter-abutment means at the upper end therof for cooperation with said elastic abutment means and connected at the lower end thereof with the parts operatively associated with the wheel suspension,
   said rod being directly adjoined in the radial direction by said abutment means, and said abutment means being directly adjoined in the radial direction by said guide tube means,
   a ring member detachably secured at the lower end of the guide tube means within the same, said elastic abutment means which is constructed as a hollow cylinder resting on said ring member, and a gap remaining between the inner diameter of said ring member and said rod for the passage of the hydraulic working medium.

3. An arrangement for limiting the outward spring stroke in hydro-pneumatic spring systems, especially in the spring legs of hydro-pneumatic spring systems of motor vehicles having a vehicle superstructure and a wheel suspension, comprising a spring leg assembly having a plurality of parts, some of which are operatively associated with the superstructure and some of which with the wheel suspension, and which include:
   a guide tube means forming a part operatively associated with the superstructure,
   spring-leg pot means and slidable tube means connected with said pot means and forming parts operatively associated with the wheel suspension,
   said guide tube means serving for the longitudinally movable support of said spring-leg pot means and of said slidable tube means,
   elastic abutment means arranged in the lower region within said guide tube means,
   and connecting means including a rod extending through said elastic abutment means and including counter-abutment means at the upper end therof for cooperation with said elastic abutment means and connected at the lower end thereof with the parts operatively associated with the wheel suspension,
   a ring member detachably secured at the lower end of the guide tube means within the same, said elastic abutment means which is constructed as hollow cylinder resting on said ring member, and a gap remaining between the inner diameter of said ring member and said rod for the passage of the hydraulic working medium.
   and a relatively larger annular gap remaining between said rod and the inner wall of the elastic abutment means in the relieved condition of the latter.

4. An arrangement for limiting the outward spring stroke in hydro-pneumatic spring systems, especially in the spring legs of hydro-pneumatic spring systems of motor vehicles having a vehicle superstructure and a wheel suspension, comprising a spring leg assembly having a plurality of parts, some of which are operatively associated with the superstructure and some of which with the wheel suspension, and which include:
   a guide tube means in the form of a single tubular member constituting a part operatively associated with the superstructure, spring-leg pot means forming a part of the hydro-pneumatic spring system and slidable tube means connected with said pot means and constituting parts operatively associated with the wheel suspension,
   said guide tube means serving for the longitudinally movable support of said spring-leg pot means and of said slidable tube means,
   said slidable tube means sliding on the outside of said guide tube means,
   elastic abutment means arranged directly within said guide tube means in the lower region thereof,
   and connecting means extending through said elastic abutment means and including counter-abutment means at the upper end thereof for cooperation with said elastic abutment means and connected at the lower end thereof with the parts operatively associated with the wheel suspension,
   said connecting means being directly adjoined in the radial direction by said abutment means, and said abutment means being directly adjoined in the radial direction by said guide tube means, and a relatively large annular gap remaining between said connecting means and the inner wall of the elastic abutment means in the relieved condition of the latter.

5. An arrangement for limiting the outward spring stroke in hydro-pneumatic spring systems, especially in the spring legs of hydro-pneumatic spring systems of motor vehicles having a vehicle superstructure and a wheel suspension, comprising a spring leg assembly having a plurality of parts, some of which are operatively associated with the superstructure and some of which with the wheel suspension, and which include:
   a guide tube means forming a part operatively associated with the superstructure,
   spring-leg pot means and slidable tube means connected with said pot means and forming parts operatively associated with the wheel suspension,
   said guide tube means serving for the longitudinally movable support of said spring-leg pot means and of said slidable tube means,
   elastic abutment means arranged directly within said guide tube means near the lower end thereof,
   and connecting means extending through said elastic abutment means and including counter-abutment means at the upper end thereof for cooperation with said elastic abutment means and connected at the lower end thereof with the parts operatively associated with the wheel suspension,
   said connecting means being directly adjoined in the radial direction by said abutment means, and said abutment means being directly adjoined in the radial direction by said guide tube means,
   a collar member provided at the upper end of said connecting means, the diameter of said collar member being smaller than the inner diameter of said guide tube means and serving for the support of the counter-abutment means,
   groove means being provided within said counter-abutment means for the passage of the hydraulic medium.

6. An arrangement for limiting the outward spring stroke in hydro-pneumatic spring systems, especially in the spring legs of hydro-pneumatic spring systems of motor vehicles having a vehicle superstructure and a wheel suspension, comprising a spring leg assembly having a plurality of parts, some of which are operatively associated with the superstructure and some of which with the wheel suspension, and which include:
   a guide tube means forming a part operatively associated with the superstructure,
   spring-leg pot means and slidable tube means connected with said pot means and forming parts operatively associated with the wheel suspension,
   said guide tube means serving for the longitudinally movable support of said spring-leg pot means and of said slidable tube means,
   elastic abutment means arranged in the lower region within said guide tube means,
   and connecting means extending through said elastic abutment means and including counter-abutment means at the upper end thereof for cooperation with said elastic abutment means and connected at the lower end thereof with the parts of the spring leg assembly operatively associated with the wheel suspension,
   and a bottom piece secured to the lower end of the sliding tube means which serves for the secure assembly of the lower end of said connecting means,
   and sleeve means threadedly secured to the outside of the lower end of said sliding tube means, the lower end of said sleeve means projecting beyond the lower end of said sliding tube means, and the bottom piece being threaded into the internal thread provided in said sleeve means.

7. An arrangement for limiting the outward spring stroke in hydro-pneumatic spring systems, especially in the spring legs of hydro-pneumatic spring systems of motor vehicles having a vehicle superstructure and a wheel suspension, comprising a spring leg assembly having a plurality of parts, some of which are operatively associated with the superstructure and some of which with the wheel suspension, and which include:
   a guide tube means forming a part operatively associated with the superstructure,
   spring-leg pot means and slidable tube means connected with said pot means and forming parts operatively associated with the wheel suspension,
   said guide tube means serving for the longitudinally movable support of said spring-leg pot means and of said slidable tube means,
   elastic abutment means arranged in the lower region within said guide tube means,
   and connecting means including a rod extending through said elastic abutment means and including counter-abutment means at the upper end thereof for cooperation with said elastic abutment means and connected at the lower end thereof with the parts of the spring leg assembly operatively associated with the wheel suspension,
   and a bottom piece secured to the lower end of the sliding tube means which serves for the secure assembly of the lower end of the rod forming said connecting means,
   said rod being threadably secured in said bottom piece.

8. An arrangement for limiting the outward spring stroke in hydro-pneumatic spring systems, especially in the spring legs of hydro-pneumatic spring systems of motor vehicles having a vehicle superstructure and a wheel suspension, comprising a spring leg assembly having a plurality of parts, some of which are operatively associated with the superstructure and some of which with the wheel suspension, and which include:
   a guide tube means forming a part operatively associated with the superstructure,
   spring-leg pot means and slidable tube means connected with said pot means and forming parts operatively associated with the wheel suspension,
   said guide tube means serving for the longitudinally movable support of said spring-leg pot means and of said slidable tube means,
   elastic abutment means arranged in the lower region within said guide tube means,
   and connecting means including a rod extending through said elastic abutment means and including counter-abutment means at the upper end thereof for cooperation with said elastic abutment means and connected at the lower end thereof with the parts of the spring leg assembly operatively associated with the wheel suspension,
   and a bottom piece secured to the lower end of the sliding tube means which serves for the secure assembly of the lower end of the rod forming said connecting means,
   said rod being threadably secured in said bottom piece.
   and sleeve means threadably secured to the outside of the lower end of said sliding tube means, the lower end of said sleeve means projecting beyond the lower end of said sliding tube means, and the bottom piece being threaded into the internal thread provided in said sleeve means.

9. An arrangement for limiting the outward spring stroke in hydro-pneumatic spring systems, especially in the spring legs of hydro-pneumatic spring systems of motor vehicles having a vehicle superstructure and a wheel suspension, comprising a spring leg assembly having a plurality of parts, some of which are operatively associated with the superstructure and some of which with the wheel suspension, and which include:
   a guide tube means in the form of a single tubular element and constituting a part operatively associated with the superstructure, spring-leg pot means forming a part of the hydro-pneumatic spring system and slidable tube means connected with said pot means and constituting parts operatively associated with the wheel suspension, said guide tube means serving for the longitudinally movable support of said spring-leg pot means and of said slidable tube means, elastic abutment means arranged directly within said guide tube means near the lower end thereof, and connecting means extending through said elastic abutment means and including counter-abutment means at the upper end thereof for cooperation with said elastic abutment means and connected at the lower end thereof with the parts operatively associated with the wheel suspension, said slidable tube means sliding directly on the outside of said guide tube means, said elastic abutment means being operable to engage with the outer surfaces directly the inner surfaces of said guide tube means, and said connecting means being adjoined directly in the radial direction by said abutment means, and said abutment means being adjoined directly in the radial direction by said guide tube means, the length of the elastic abutment means amounting to about ⅓ of the length of the guide tube means.

10. An arrangement for limiting the outward spring stroke in hydro-pneumatic spring systems, especially in the spring legs of hydro-pneumatic spring systems of motor vehicles having a vehicle superstructure and a wheel suspension, comprising a spring leg assembly having a plurality of parts, some of which are operatively associated with the superstructure and some of which with the wheel suspension, and which include:

a guide tube means forming a part operatively associated with the superstructure, spring-leg pot means forming a part of the hydro-pneumatic spring system and slidable tube means connected with said pot means and constituting parts operatively associated with the wheel suspension, said guide tube means serving for the longitudinally movable support of said spring-leg pot means and of said slidable tube means, elastic abutment means arranged directly within said guide tube means in the lower region thereof, and connecting means extending through said elastic abutment means and including counter-abutment means at the upper end thereof for cooperation with said elastic abutment means and connected at the lower end thereof with the parts operatively associated with the wheel suspension, said slidable tube means sliding directly on the outside of said guide tube means, said elastic abutment means being operable to engage with the outer surface directly the inner surfaces of said guide tube means, and said connecting means being directly adjoined in the radial direction by said abutment means, and said abutment means being adjoined directly in the radial direction by said guide tube means, means for detachably securing the lower end of said guide tube means, said elastic abutment means being constructed as a hollow cylinder, said connecting means extending also through said detachable securing means, and a gap remaining between the inner diameter of said detachable securing means and said connecting means for the passage of the hydraulic working medium, and a relatively large annular gap remaining between said connecting means and the inner wall of the elastic abutment means in the relieved condition of the latter.

11. An arrangement for limiting the outward spring stroke in hydro-pneumatic spring systems, especially in the spring legs of hydro-pneumatic spring systems of motor vehicles having a vehicle superstructure and a wheel suspension, comprising a spring leg assembly having a plurality of parts, some of which are operatively associated with the superstructure and some of which with the wheel suspension, and which include:

a guide tube means forming a part operatively associated with the superstructure, spring-leg pot means and slidable tube means connected with said pot means and forming parts operatively associated with the wheel suspension, said guide tube means serving for the longitudinally movable support of said spring-leg pot means and of said slidable tube means, elastic abutment means arranged in the lower region within said guide tube means, and connecting means including a rod extending through said elastic abutment means and including counter-abutment means at the upper end thereof for cooperation with said elastic abutment means and connected at the lower end thereof with the parts operatively associated with the wheel suspension, a ring member detachably secured at the lower end of the guide tube means within the same, said elastic abutment means which is constructed as a hollow cylinder resting on said ring member, and a gap remaining between the inner diameter of said ring member and said rod for the passage of the hydraulic working medium, and a relatively larger annular gap remaining between said rod and the inner wall of the elastic abutment means in the relieved condition of the latter, and a collar member provided at the upper end of said rod, the diameter of said collar member being smaller than the inner diameter of said guide tube means and serving for the support of the counter-abutment means which is in the form of a disc made of plastic material, groove means being provided within said disc for the passage of the hydraulic medium, and a bottom piece secured to the lower end of the sliding tube means which serves for the secure fastening of the lower end of said rod.

12. An arrangement for limiting the outward spring stroke in hydro-pneumatic spring systems, especially in the spring legs of hydro-pneumatic spring systems of motor vehicles having a vehicle superstructure and a wheel suspension, comprising a spring leg assembly having a plurality of parts, some of which are operatively associated with the superstructure and some of which with the wheel suspension, and which include:

a guide tube means forming a part operatively associated with the superstructure, spring-leg pot means forming a part of the hydro-pneumatic spring system and slidable tube means connected with said pot means and constituting parts operatively associated with the wheel suspension, said guide tube means serving for the longitudinally movable support of said spring-leg pot means and of said slidable tube means, elastic abutment means being constructed as a hollow cylinder arranged directly within said guide tube means in the lower region thereof, said slidable tube means sliding directly on said guide tube means, and connecting means including a rod extending through said elastic abutment means and including counter-abutment means at the upper end thereof for cooperation with said elastic abutment means and connected at the lower end thereof with the parts operatively associated with the wheel suspension, said elastic abutment means being secured in said guide tube means, and an annular gap remaining between said rod and the inner wall of the elastic abutment means in the relieved condition of the latter.

13. An arrangement according to claim 12 wherein said elastic abutment abuts with the external walls thereof against the internal walls of said guide tube means.

References Cited by the Examiner

UNITED STATES PATENTS

| | | | |
|---|---|---|---|
| 1,107,714 | 8/1914 | Sharp | 767—35 |
| 2,248,865 | 7/1941 | Griepersroh | 267—64 |
| 2,325,430 | 7/1943 | Setz | 267—64 |
| 2,823,915 | 2/1958 | Bourcier De Carbon | 267—64 |
| 3,047,284 | 7/1962 | Bohles | 267—64 |
| 3,109,638 | 11/1963 | Riemer | 267—64 |

FOREIGN PATENTS

| | | |
|---|---|---|
| 13,458 | 1933 | Australia. |
| 209,506 | 7/1957 | Australia. |
| 1,121,485 | 1/1962 | Germany. |

ARTHUR L. LA POINT, *Primary Examiner.*

H. R. FIELD, *Assistant Examiner.*